(12) United States Patent
Vigneaux

(10) Patent No.: US 8,849,073 B2
(45) Date of Patent: Sep. 30, 2014

(54) PRESSURE AND MEASUREMENT BY MEANS OF AN OPTICAL FIBER

(75) Inventor: Pierre Vigneaux, Moisenay (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 315 days.

(21) Appl. No.: 13/499,287

(22) PCT Filed: Oct. 8, 2010

(86) PCT No.: PCT/EP2010/006163
§ 371 (c)(1),
(2), (4) Date: Apr. 23, 2012

(87) PCT Pub. No.: WO2011/045006
PCT Pub. Date: Apr. 21, 2011

(65) Prior Publication Data
US 2012/0234101 A1    Sep. 20, 2012

(30) Foreign Application Priority Data
Oct. 12, 2009   (EP) .................................... 09290777

(51) Int. Cl.
*G02B 6/00* (2006.01)
*G01L 1/24* (2006.01)
*G02B 6/02* (2006.01)
*G01L 11/02* (2006.01)

(52) U.S. Cl.
CPC .............. *G01L 1/246* (2013.01); *G02B 6/0238* (2013.01); *G01L 11/025* (2013.01)
USPC .......................................................... 385/13

(58) Field of Classification Search
CPC ......... G01L 1/242; G01L 1/243; G01L 1/245; G01L 1/246; G01L 1/247; G02B 6/02057; G02B 6/02076; G02B 6/02295; G02B 6/02314; G02B 6/02319; G02B 6/02333; G02B 6/0238; G02B 2006/12138
USPC .......................................................... 385/13
See application file for complete search history.

(56) References Cited

U.S. PATENT DOCUMENTS

| 5,309,540 | A  |   | 5/1994  | Turpin et al. |
| 5,591,965 | A  |   | 1/1997  | Udd |
| 5,841,131 | A  |   | 11/1998 | Schroeder et al. |
| 2006/0291789 | A1 | * | 12/2006 | Folkenberg et al. .......... 385/123 |
| 2007/0062696 | A1 | * | 3/2007  | Wilson et al. .............. 166/254.2 |

FOREIGN PATENT DOCUMENTS

EP   0147225   2/1990

* cited by examiner

*Primary Examiner* — Ryan Lepisto
(74) *Attorney, Agent, or Firm* — Michael Dae

(57) ABSTRACT

An optical fiber (FD) that can be used for measuring pressure is arranged as follows. The optical fiber (FD) comprises a core (CO) and a cladding (CL) surrounding and contacting the core (CO). A stress-applying arrangement (SE1, SE2), which is embedded in the cladding (CL), applies constant anisotropic stress on the core (CO). This causes the core (CO) to exhibit a deformation. A pressure conversion arrangement (HO1, H02), which is also embedded in the cladding (CL), converts isotropic external pressure applied to the optical fiber (FD) into pressure-dependent anisotropic stress applied to the core (CO). The pressure conversion arrangement (HO1, H02) is disposed with respect to the stress-applying arrangement (SE1, SE2) so that the pressure-dependent anisotropic stress enhances the deformation of the core (CO) caused by the constant anisotropic stress.

16 Claims, 3 Drawing Sheets

PRESSURE AND MEASUREMENT BY MEANS OF AN OPTICAL FIBER

FIELD OF THE INVENTION

The present invention generally relates to an optical fiber that can be used for measuring pressure. The optical fiber may be used, for example, to measure pressure in a well that has been drilled for the purpose of oil exploration and production. Other aspects of the invention relate to a pressure measurement system and a method of measuring pressure.

BACKGROUND OF THE INVENTION

Optical fiber from the prior art can be arranged as follows for the purpose of measuring pressure. The optical fiber, which has a core, is provided with elements that apply constant anisotropic stress on the core. The core undergoes a deformation so that so that the core exhibits birefringence. Birefringence means that there are two possible modes of light propagation with two different propagation velocities. Hence, the core exhibits two different indices of refraction. In terms of magnitude, the birefringence can be defined as the difference between the two indices of refraction. The optical fiber from the art is further provided with a structure that converts isotropic external pressure into pressure-dependent anisotropic stress applied to the core. The isotropic external pressure affects the deformation of the core. Accordingly, the birefringence varies with isotropic external pressure that is applied to the optical fiber.

There are various ways to measure external pressure on the basis of the birefringence that the core of an optical fiber exhibits. According to one technique, the core is provided with a so-called fiber Bragg grating. As a result of the birefringence, the fiber Bragg grating has a spectral reflectivity response that comprises two peaks at two slightly different frequencies. That is, there is a frequency difference between the two peaks. The frequency difference is a function of the birefringence, and hence a function of the external pressure that is applied to the optical fiber. The external pressure can thus be determined on the basis of the frequency difference between the two peaks of the spectral reflectivity response, which the fiber Bragg grating provides.

U.S. Pat. No. 5,841,131 describes a fiber optic pressure transducer that includes a core which is provided with one or more gratings. The core is provided with cladding that has a pair of birefringence inducing rods, as well as a pair of longitudinal side holes. The side holes convert isotropic pressure forces to anisotropic forces. The stress-inducing rods are arranged with their longitudinal axes lying in a first plane. The longitudinal axes of the side holes lie in a second plane, which is substantially orthogonal to the first plane.

U.S. Pat. No. 5,309,540 discloses a hollow fiber with, over the full length of the fiber and between each fiber channel and the core, at least one stress zone to create an anisotropic stress distribution which subject the fiber core to a tensile stress. The fiber can be used as a pressure sensor or a pressure transducer.

SUMMARY OF THE INVENTION

Despite the valuable contributions in the art, there is a need for a solution that allows more precise pressure measurements at relatively modest cost. Indeed, in some applications, the pressure that is in the environment surrounding the fiber optic does not reach the threshold value necessary to be detected by fibers from the art or if detected then the measurement is not precise enough. In order to better address this need, the following points have been taken into consideration.

The fiber optic pressure transducer according to the aforementioned U.S. Pat. No. 5,841,131 exhibits a birefringence that decreases as external pressure increases starting from a default, atmospheric pressure. That is, the birefringence becomes smaller and smaller as more and more external pressure is applied. As long as the birefringence is above a critical magnitude, pressure measurements can be sufficiently precise. However, there will be a pressure range in which pressure measurements are insufficiently precise, or even impossible. For example, the two peaks in the spectral reflectivity response, which the fiber Bragg grating provides, may be too close to each other to be distinguished.

In U.S. Pat. No. 5,309,540 the use of elastic properties of silica is described and the birefringence increases while external pressure increases. Accordingly the range of potential measurement is increased; however it has been surprisingly found that the concentration and the arrangement of holes can lead to superior performance.

In accordance with an aspect of the invention, an optical fiber comprises:
a core;
a cladding, surrounding and contacting the core;
a stress-applying arrangement embedded in the cladding for applying constant anisotropic stress on the core, which causes the core to exhibit a deformation;
a pressure conversion arrangement embedded in the cladding for converting isotropic external pressure applied to the optical fiber into pressure-dependent anisotropic stress applied to the core, the pressure conversion arrangement being surrounded by the stress-applying arrangement so that the pressure-dependent anisotropic stress enhances the deformation of the core caused by the constant anisotropic stress.

In accordance with another aspect of the invention, a pressure measurement system comprises:
a light-injecting arrangement for injecting light into the optical fiber as defined hereinbefore, so as to obtain a response; and
a measurement arrangement for measuring a parameter of the response that varies as a function of birefringence of the core.

In accordance with yet another aspect of the invention, a method of measuring pressure comprises:
a preparation step in which the optical fiber as defined hereinbefore is placed in an environment in which pressure needs to be measured;
a light injecting step in which light is injected into the optical fiber, so as to obtain a response; and
a measurement step in which a physical parameter of the response that varies as a function of birefringence of the core is measured.

The optical fiber defined hereinbefore exhibits birefringence that increases as the external pressure increases, starting from a default, atmospheric pressure. There is no inherent pressure range above the default, atmospheric pressure, in which the birefringence is below a critical level in terms of measurement precision. It is thus possible to enable sufficiently precise pressure measurements starting from the default, atmospheric pressure up to a structural limit where the external pressure becomes so large that the optical fiber is damaged.

The optical fiber defined hereinbefore can be manufactured at relatively modest cost. This is because it is sufficient to embed the stress-applying arrangement and the pressure conversion arrangement in the cladding that surrounds and contacts the core. There is no absolute need for a further, specific cladding, or other further specific structural elements, in order to ensure that the birefringence increases with the external pressure. However, a further cladding or a further structural element may be applied in order to achieve one or more further advantageous effects.

An implementation of the invention advantageously comprises one or more of the following additional features, which are described in separate paragraphs. These additional features each contribute to achieving precise pressure measurements at modest cost.

The stress-applying arrangement may comprise a pair of rod-like stress-inducing elements disposed longitudinally and symmetrically with respect to the core.

The pressure conversion arrangement may comprise a pair of rod-like holes disposed longitudinally and symmetrically with respect to the core.

The rod-like stress-inducing elements are hollow so that the rod-like holes are comprised within the pair of rod-like stress-inducing elements.

The pressure conversion arrangement may comprise a plurality of pairs of rod-like holes. This allows measurement of relatively high pressures.

The plurality of pairs of rod-like holes may be disposed so that these form a pair of clusters. This further contributes to measurement of relatively high pressures.

The pair of clusters may be bowtie-shaped in a transverse cross-section of the optical fiber. This yet further contributes to measurement of relatively high pressures.

The rod-like stress-inducing elements may have a thermal expansion coefficient different from that of the cladding.

The rod-like stress-inducing elements may comprise borosilicate.

The core may be provided with a fiber Bragg grating.

The measurement arrangement mentioned hereinbefore may be arranged to measure a difference between two Bragg wavelengths, which the fiber Bragg grating exhibits as result of the birefringence.

The light injecting arrangement mentioned hereinbefore may comprise a broad spectrum light source so that the light injected into the optical fiber exhibits a spectrum susceptible of comprising the two Bragg wavelengths. The detection arrangement may then comprise an optical spectrum analyzer for measuring a spectrum of reflected light returned by the fiber Bragg grating.

DETAILED DESCRIPTION

Figure 1:
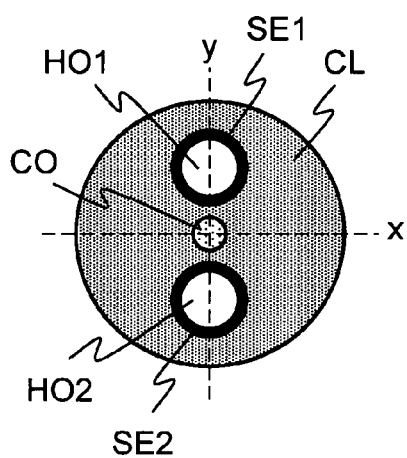
FIG. 1 is a schematic diagram that illustrates a transverse cross-section of an optical fiber that can be used for measuring pressure.
Figure 2:
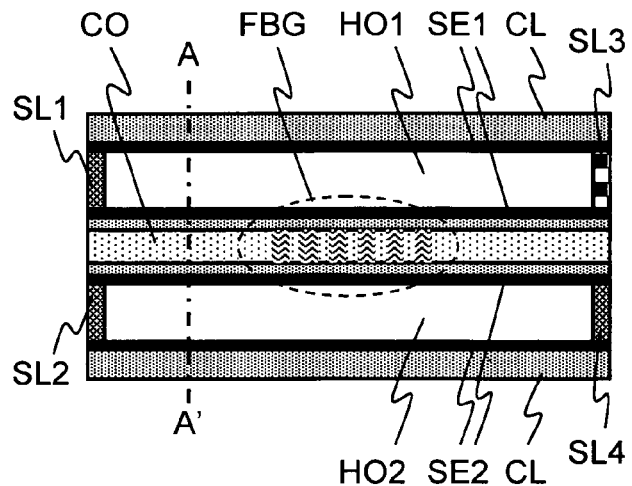
FIG. 2 is a schematic diagram that illustrates a longitudinal cross-section of the optical fiber.

FIGS. 1 and 2 schematically illustrate an optical fiber FD that can be used for measuring pressure. FIGS. 1 and 2 provide two different views of the optical fiber FD: a transverse cross-sectional view and a longitudinal cross-sectional view, respectively. FIG. 2 illustrates a line A-A' across which the cross-sectional view of FIG. 1 is taken.

The optical fiber FD comprises a core CO and a cladding CL. A pair of rod-like stress-inducing elements SE1, SE2 is embedded in the cladding CL. The rod-like stress-inducing elements SE1, SE2 are hollow. That is, the pair of rod-like stress-inducing elements SE1, SE2 comprises a pair of rod-like holes HO1, HO2. The rod-like stress-inducing elements SE1, SE2 are provided with seals SL1-SL4 at their respective extremities, as illustrated in FIG. 2. These seals SL1-SL4 seal off the rod-like holes HO1, HO2 so that a default, atmospheric pressure is maintained within these holes, whatever external pressure is applied to the optical fiber FD.

The rod-like stress-inducing elements SE1, SE2 are disposed longitudinally and symmetrically with respect to the core CO. The same applies to the pair of rod-like holes HO1, HO2. The optical fiber FD has a center, which forms an origin of an x-axis and a y-axis illustrated in FIG. 1. The pair of rod-like stress-inducing elements SE1, SE2 and the pair of rod-like holes HO1, HO2 are aligned on the y-axis.

The rod-like stress-inducing elements SE1, SE2 may be formed of, for example, a material having a thermal expansion coefficient that is higher than that of the cladding CL. For example, the rod-like stress-inducing elements SE1, SE2 may be formed of borosilicate, whereas the core CO may be formed of relatively pure silica. In a manufacturing process, the cladding CL and the rod-like stress-inducing elements SE1, SE2 are typically assembled under heat, and subsequently cooled down. Since the thermal expansion coefficient of the rod-like stress-inducing elements SE1, SE2 is higher than that of the cladding CL, the rod-like stress-inducing elements SE1, SE2 will shrink to a greater degree than the cladding CL, while remaining in contact with the cladding CL. This induces constant anisotropic stress on the core CO. The constant anisotropic stress can be characterized as pulling forces on the core CO that are oriented along the y-axis.

FIG. 2 illustrates that the core CO is provided with a fiber Bragg grating FBG. A fiber Bragg grating is a pattern of structural changes in the core CO, which causes a pattern of refractive index variations in a longitudinal direction. The pattern may effectively be written by means of, for example, intense ultraviolet light. A fiber Bragg grating effectively forms a wavelength-specific reflector: light components may be substantially reflected at a given wavelength, whereas light components may be substantially transmitted at another wavelength. A fiber Bragg grating thus typically has two spectral responses that are complementary: a spectral reflectivity response and a spectral transmittivity response.

Figure 3:
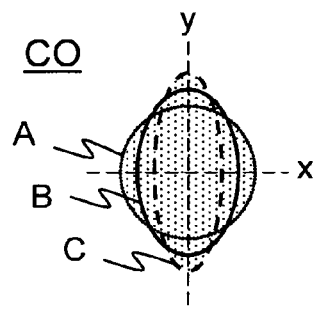
FIG. 3 is a schematic diagram that illustrates elliptical deformation of a core of the optical fiber.

FIG. 3 illustrates an elliptical deformation of the core CO. The elliptical deformation occurs when the core CO goes through three different states: A, B, and C. In state A, the core CO is assumed to form part of an optical fiber FD that has a cladding similar to the cladding CL illustrated in FIG. 1, but without the pair of rod-like stress-inducing elements SE1, SE2 and thus without the pair of rod-like holes HO1, HO2. As a result, in state A, the core CO does not undergo any particular stress and has therefore a circumference that is substantially circular. There is no elliptical deformation in state A.

In state B, the core CO forms part of the optical fiber FD illustrated in FIG. 1, whereby no pressure is applied to the optical fiber FD other than a default, atmospheric pressure. The core CO undergoes the constant anisotropic stress that results from the pair of rod-like stress-inducing elements SE1, SE2 embedded in the cladding CL, as mentioned hereinbefore. As a result, the core CO is elliptically deformed; the core CO exhibits a degree of ellipticity. Due to the elliptical deformation, the core CO has a major diameter and a minor diameter. The major diameter is aligned on the pair of rod-like stress-inducing elements SE1, SE2, and is thus aligned on the y-axis. The minor diameter is aligned on the x-axis.

In state C, the core CO forms part of the optical fiber FD illustrated in FIG. 1, whereby isotropic external pressure is applied to the optical fiber FD. The pair of rod-like holes HO1, HO2 constitutes an arrangement that effectively converts the isotropic external pressure into pressure-dependent anisotropic stress that is applied to the core CO. Since the pair of rod-like holes HO1, HO2 is aligned on the y-axis, the isotropic external pressure is effectively dampened along this axis, whereas the cladding CL effectively transfers this pressure to the core CO along the x-axis without such dampening. The pressure-dependent anisotropic stress that is applied on the core CO can be characterized as pushing forces on the core CO. These pushing forces are larger along the x-axis than along the y-axis. The pressure-dependent anisotropic stress thus enhances the elliptical deformation of the core CO. The core CO exhibits a higher degree of ellipticity in state C than in state B, as illustrated in FIG. 3. In general, the degree of ellipticity that the core CO exhibits increases with the isotropic external pressure that is applied to the optical fiber FD.

The elliptical deformation, which occurs in state B and state C, will cause the core CO to exhibit birefringence. Birefringence means that light can propagate within the core CO according to two possible modes, each having a different propagation velocity. Stated otherwise, the core CO exhibits two different indices of refraction, one for each mode of propagation. In terms of magnitude, the birefringence can be defined as the difference between the two indices of refraction. The greater the degree of ellipticity that the core CO exhibits, the greater the birefringence is.

Figure 4:
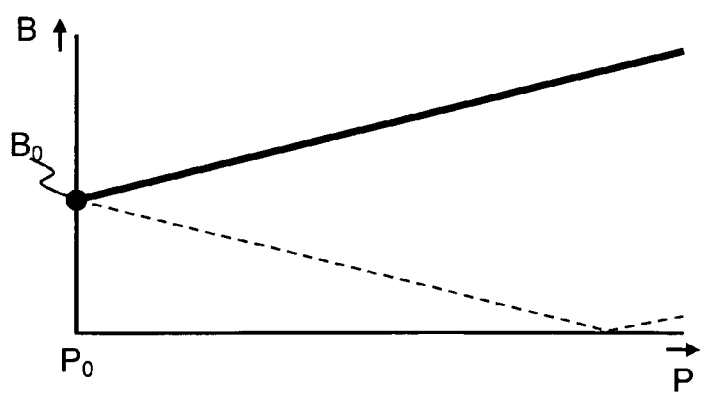
FIG. 4 is a graph that illustrates birefringence of the core as a function of external pressure.

FIG. 4 illustrates the birefringence of the core CO as a function of an isotropic external pressure applied to the optical fiber FD that is illustrated in FIGS. 1 and 2. FIG. 4 is a graph that has a horizontal axis, which represents the isotropic external pressure P, and a vertical axis, which represents the birefringence B. A relatively thick line represents the function according to which the birefringence varies with the anisotropic external pressure applied to the optical fiber FD.

The birefringence has a default magnitude $B_0$ when a default, atmospheric pressure $P_0$ is applied to the optical fiber FD. The rod-like stress-inducing elements SE1, SE2 determine this default magnitude $B_0$ of the birefringence. The greater the constant anisotropic stress is that these elements apply to the core CO, the greater the default magnitude $B_0$ of the birefringence. The rod-like stress-inducing elements SE1, SE2 thus effectively introduce an offset in the birefringence.

The birefringence increases with the isotropic external pressure that is applied to the optical fiber FD. That is, the function according to which the birefringence varies with the isotropic external pressure has a positive first derivative at the default, atmospheric pressure $P_0$, as well as at other magnitudes of pressure. This is because the optical fiber FD illustrated in FIGS. 1 and 2 is arranged so that the degree of ellipticity that the core CO exhibits increases with the isotropic external pressure that is applied to the optical fiber FD.

More specifically, the rod-like stress-inducing elements SE1, SE2 are aligned on the y-axis, as illustrated in FIG. 1. The constant anisotropic stress that these elements provide can be characterized as pulling forces on the core CO that are substantially aligned on this axis. Consequently, the major diameter of the core CO, which is elliptical, is aligned on the y-axis. The rod-like holes HO1, HO2 are also aligned on the y-axis. The pressure-dependent anisotropic stress can be characterized as pushing forces on the core, which are stronger along the x-axis than along the y-axis. The pressure-dependent anisotropic stress thus causes the major diameter of the core CO to increase and the minor diameter to decrease. The pressure-dependent anisotropic stress thus enhances the elliptical deformation of the core CO caused by the constant anisotropic stress that the rod-like stress-inducing elements SE1, SE2 apply. As a result, the birefringence that the core CO exhibits increases.

FIG. 4 comprises a curve in relatively thin broken lines. This curve relates to the fiber optic transducer embodiments illustrated in FIGS. 11-14 of U.S. Pat. No. 5,841,131 mentioned hereinbefore. The curve represents a function according to which the birefringence varies with the isotropic external pressure. It is assumed that the birefringence that these prior-art embodiments exhibit at the default, atmospheric pressure $P_0$, corresponds with the default magnitude $B_0$ of the birefringence of the optical fiber FD illustrated in FIGS. 1 and 2. Stated briefly, there is a similar offset.

The birefringence of some of the prior-art embodiments decreases as isotropic external pressure increases, starting from the default, atmospheric pressure $P_0$. That is, the function according to which the birefringence varies with the isotropic external pressure has a negative first derivative at the default, atmospheric pressure $P_0$. In contrast, the function that applies to the optical fiber FD illustrated in FIGS. 1 and 2 has a positive first derivative. Assuming that the prior-art embodiments are not damaged as the isotropic external pressure increases, the birefringence becomes zero at a given magnitude of the isotropic external pressure. After this point, the birefringence increases as the isotropic external pressure further increases.

Figure 5:
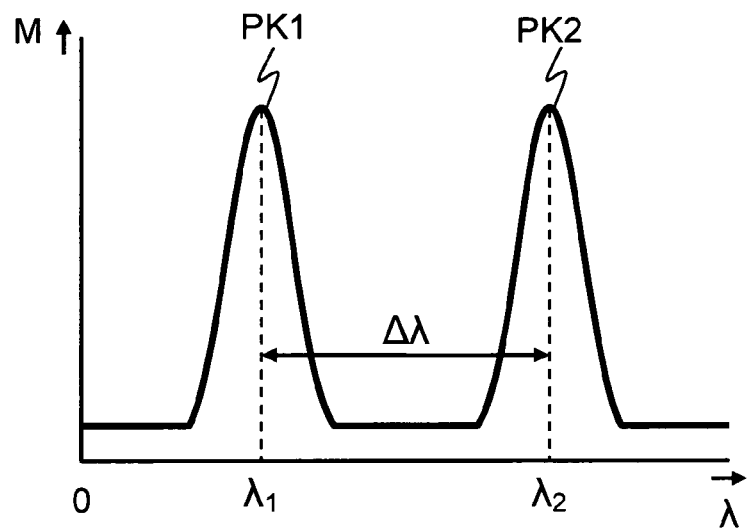
FIG. 5 is a graph that illustrates a spectral reflectivity response of a fiber Bragg grating comprised in the optical fiber.

FIG. 5 illustrates the spectral reflectivity response of the fiber Bragg grating FBG of the optical fiber FD illustrated in FIG. 2. FIG. 5 is a graph that has a horizontal axis, which represent wavelength λ, and a vertical axis, which represents magnitude M. A curve in relatively thick lines represents the spectral reflectivity response.

The spectral reflectivity response comprises two peaks PK1, PK2. The two peaks PK1, PK2 result from the birefringence that the core CO exhibits. This can be explained as follows. A fiber Bragg grating written in a core of an optical fiber that does not exhibit any birefringence typically has a single so-called Bragg wavelength: a wavelength at which light components are most reflected. Two main parameters substantially determine the Bragg wavelength: (1) a grating period that characterizes the pattern of structural variations in the fiber Bragg grating, and (2) an effective refractive index in the fiber Bragg grating, which typically corresponds to an average refractive index. Since the core CO of the optical fiber FD illustrated in FIGS. 1 and 2 exhibits birefringence, there are two different effective refractive indices in the fiber Bragg grating FBG. The fiber Bragg grating FBG will thus have two Bragg wavelengths: a first Bragg wavelength λ1 that provides a first peak PK1 and a second Bragg wavelength λ2 that provides a second peak PK2 in the spectral reflectivity response.

There is thus a wavelength difference Δλ between the two peaks PK1, PK2 in the spectral reflectivity response, which corresponds with a difference between the two Bragg wavelengths. The wavelength difference Δλ is a function of the birefringence that the core CO of the optical fiber FD exhibits. The stronger the birefringence is, the greater the wavelength difference Δλ between the two peaks PK1, PK2 in the spectral reflectivity response. Since the birefringence is a function of the isotropic external pressure that is applied to the optical fiber FD, as illustrated in FIG. 4, the wavelength difference Δλ is a function of the isotropic external pressure. The stronger the isotropic external pressure is, the greater the wavelength difference Δλ between the two peaks PK1, PK2 in the spectral reflectivity response is.

The function according to which the wavelength difference Δλ varies with the isotropic external pressure can be determined by means of measurement and/or interpolation. The function may also be theoretically determined, at least partially. The function can serve as a basis for measuring pressure by means of the optical fiber FD illustrated in FIGS. 1 and 2. It is generally sufficient to identify two peaks PK1, PK2 in the spectral reflectivity response of the fiber Bragg grating FBG, and to measure the wavelength difference Δλ between these two peaks PK1, PK2.

Figure 6:
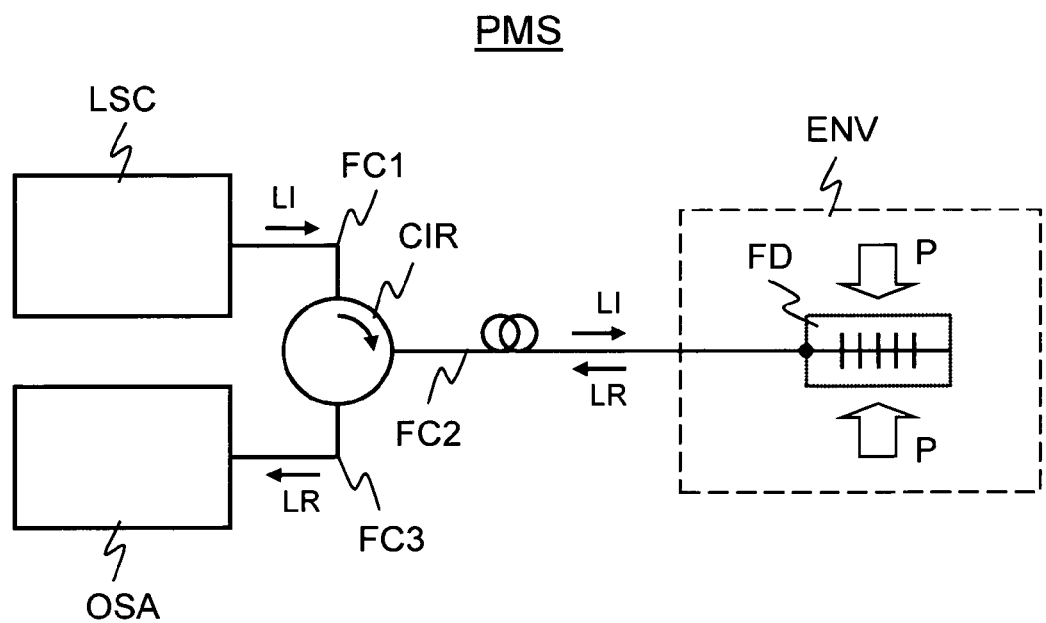
FIG. 6 is a block diagram that illustrates a pressure measurement system.

FIG. 6 illustrates a pressure measurement system PMS that employs the optical fiber FD illustrated in FIGS. 1 and 2 and described hereinbefore. The optical fiber FD has been placed in an environment ENV where pressure needs to be measured. The environment ENV may be; for example, a particular section of a well that has been drilled for the purpose of oil exploration and production. In the environment ENV, the optical fiber FD is exposed to isotropic external pressure P.

The pressure measurement system PMS comprises a light source LSC, a circulator CIR, an optical spectrum analyzer OSA, and various optical fiber cables FC1, FC2, FC3. Optical fiber cable FC1 is coupled between an output of the light source LSC and a first port of the circulator CIR. Optical fiber cable FC2 is coupled between a second port of the circulator CIR and the optical fiber FD that is pressure sensitive. Optical fiber cable FC3 is coupled between a third port of the circulator CIR and an input of the optical spectrum analyzer OSA.

The pressure measurement system PMS basically operates as follows. The light source LSC injects stimulus light LI into the optical fiber cable FC1. The stimulus light LI has a relatively broad spectrum, which comprises the two Bragg wavelengths of the fiber Bragg grating FBG in the core CO of the optical fiber FD that is pressure sensitive. Optical fiber cable FC1 transfers the stimulus light LI to the circulator CIR. The circulator CIR receives the stimulus light LI at its first port and, as a result, transfers the stimulus light LI to its second port, where the stimulus light LI is injected into optical fiber cable FC2. Optical fiber cable FC2 transfers the stimulus light LI to the optical fiber FD that is pressure sensitive.

The fiber Bragg grating FBG comprised in the optical fiber FD provides reflected light LR in response to the stimulus light LI. The reflected light LR has a spectrum that is a product of the relatively broad spectrum of the stimulus light LI and the spectral reflectivity response of the fiber Bragg grating FBG. The spectrum of the reflected light LR will thus comprise the two peaks similar to those illustrated in FIG. 5. A first peak is centered on the first Bragg wavelength λ1; a second peak is centered on the second Bragg wavelength λ2. The wavelength difference Δλ between the two Bragg wavelengths can thus be determined from the reflected light LR. As explained hereinbefore, the wavelength difference Δλ is representative of the isotropic external pressure P that is applied to the optical fiber FD.

The reflected light LR from the fiber Bragg grating FBG in the optical fiber FD propagates to the circulator CIR. The circulator CIR receives the reflected light LR at its second port and, as a result, transfers the reflected light LR to its third port, where the reflected light LR is applied to the optical fiber cable FC3. Optical fiber cable FC3 transfers the reflected light LR to the optical spectrum analyzer OSA, which measures the spectrum of the reflected light LR.

The optical spectrum analyzer OSA may thus determine the wavelength difference Δλ between the two Bragg wavelengths. A conversion module may then, on the basis of the wavelength difference Δλ, determine the isotropic external pressure that exists in the environment ENV and that is applied to the optical fiber FD. To that end, the conversion module may apply the function according to which the wavelength difference Δλ varies with the isotropic external pressure. This function can be pre-established and stored in a memory. The conversion module may be comprised in the optical spectrum analyzer OSA, or may form part of another entity, such as, for example, a computer or another type of data processing device.

A method of measuring pressure comprises may be based on the optical fiber FD illustrated in FIGS. 1 and 2 and described hereinbefore. Assuming that the method involves the pressure measurement system PMS illustrated in FIG. 6, the method may comprise the following steps. In a preparation step, the optical fiber FD is placed in the environment ENV where pressure needs to be measured. For example, in an oil exploration process, the optical fiber FD may be placed at a cement plug level in a well that has been drilled and that is cemented, so as to gather real-time information on cement setting. In a light injecting step, light is injected into the optical fiber FD via optical fiber cable FC1, circulator CIR, and optical fiber cable FC2. Accordingly, a response is obtained in the form of the reflected light LR. In a measurement step, a physical parameter of the response that varies as a function of the birefringence is measured. In this example, the physical parameter is the wavelength difference Δλ between the two Bragg wavelengths of the fiber Bragg grating FBG comprised in the optical fiber FD.

It should be noted that it is also possible to measure a temperature in the environment ENV on the basis of the spectrum of the reflected light LR. The temperature is roughly proportional to an average value of the two aforementioned peaks in the spectrum of the reflected light LR. The optical fiber FD illustrated in FIGS. 1 and 2 may thus be used for measuring temperature.

Comparative Example

Figure 7:
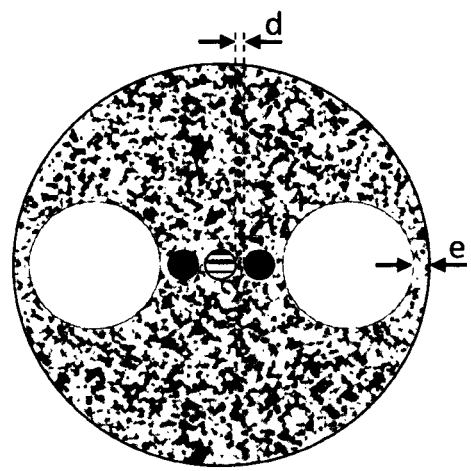
FIG. 7A is a schematic diagram that illustrate arrangement used in the prior art.
FIG. 7B is a schematic diagram that illustrate an embodiments according to the invention.
Figure 7:
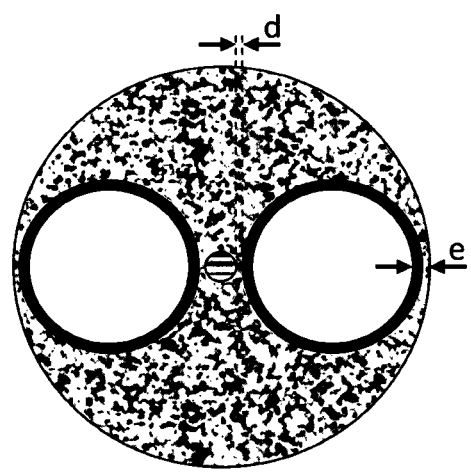

In order to evidence the technical effect obtained with the present inventive arrangement, the inventors have compared the sensitivity to pressure of an arrangement according to the prior art, see FIG. 7A and with an arrangement corresponding to the present inventive concept; see FIG. 7B.

The sensitivity to the pressure of the birefringence dB/dP has been simulated with the two designs in the same conditions.

The birefringence at $P_0$, Bo being a function of the distance between the fiber core and the SAPs, such a distance was set to obtain the same Bo with both designs. The Bo was set to be superior to $0.18 \cdot 10^{-4}$. Such a value was, for this particular comparative example, the minimum birefringence to properly identify the two peaks and their wavelength difference, Δλ, of a Fiber Brag Grating written on a Polarization Maintenance fiber and to measure the drift under pressure of the peak wavelength difference dΔλ/dP.

The mechanical resistance of the fiber to the stress generated by the surrounding pressure was essentially a function of e, the wall thickness of the wall separating the side-holes from the surrounding fluid. d was set to 10 microns.

With the arrangement corresponding to the prior art, simulations results lead to $B0=1.56*10^{-4}$, and $d\Delta\lambda/dP=0.030$ pm/psi With the arrangement according to the present invention, simulations gave $B0=1.8*10^{-4}$, and $d\Delta\lambda/dP=0.130$ pm/psi As apparent from the comparison herein, the inventive arrangement enable a higher resolution of measurement as the sensitivity to the pressure obtained is more than 4 times greater than measurement obtained with the prior art embodiments.

CONCLUDING REMARKS

The detailed description hereinbefore with reference to the drawings is merely an illustration of the invention and the additional features, which are defined in the claims. The invention can be implemented in numerous different ways. In order to illustrate this, some alternatives are briefly indicated.

The invention may be applied to advantage in numerous types of products or methods related to pressure measurement. For example, the invention may be applied in numerous different environments, which may be relatively harsh in terms of temperature, pressure, or chemical composition, or any combination of those.

There are various ways of measuring birefringence, which conveys information on pressure. For example, birefringence, and therefore pressure, can be measured on the basis of a so-called beat length. Over a given distance, two possible modes of propagation will pass through an entire cycle of being in phase and out of phase. This distance is the beat length. An optical fiber need not comprise a fiber Bragg grating in case measurements are based on beat length.

There are various ways of measuring a wavelength difference between two Bragg wavelengths. For example, referring to FIG. 5, the light source LSC can be arranged to provide light in a relatively narrow wavelength band, whereby this spectrally narrow light can be swept throughout a sufficiently wide wavelength spectrum. In that case, the optical spectrum analyzer OSA can be replaced by a relatively simple optical detector, which detects magnitude of the reflected light LR. The spectrally narrow light can successively be tuned to respective wavelengths, and the respective magnitudes of the reflected light LR at these respective wavelengths are detected.

An optical fiber in accordance with the invention may comprise several different fiber Bragg gratings, which may be successively arranged in a longitudinal direction. These different fiber Bragg gratings may have different spectral reflectivity responses. That is, the different fiber Bragg gratings may have different pairs of Bragg wavelengths. In that case, a particular pair of peaks in a spectrum of reflected light can be assigned to a particular fiber Bragg grating.

The term "rod-like" should be understood in a broad sense. The term embraces any geometrical shape that has a length that is relatively important compared with other dimensions perpendicular to the length. The term "rod-like" does not preclude any particular shape in a cross-section.

Although a drawing shows different functional entities as different blocks, this by no means excludes implementations in which a single entity carries out several functions, or in which several entities carry out a single function. In this respect, the drawings are very diagrammatic. For example, referring to FIG. 6, the light source LSC, the optical spectrum analyzer OSA, and the circulator CIR may form part of a single measurement device.

The remarks made herein before demonstrate that the detailed description with reference to the drawings, illustrate rather than limit the invention. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude a combination of additional features, which corresponds to a combination of dependent claims.

The invention claimed is:

1. An optical fiber (FD) comprising:
a core (CO);
a cladding (CL) surrounding and contacting the core,
a pressure conversion arrangement (HO) embedded in the cladding for converting isotropic external pressure applied to the optical fiber into pressure-dependent anisotropic stress applied to the core, the pressure conversion arrangement being disposed with respect to a stress-applying arrangement so that the pressure-dependent anisotropic stress enhances the deformation of the core caused by the constant anisotropic stress
a hollow stress-applying arrangement (SE) embedded in the cladding for applying constant anisotropic stress on the core wherein the pressure conversion arrangement (HO) is comprised within the hollow stress-applying arrangement (SE); and
wherein:
the stress-applying arrangement comprises a pair of rod-like stress-inducing elements (SE1, SE2) disposed longitudinally and symmetrically with respect to the core (CO); or
the pressure conversion arrangement comprises a pair of rod-like holes (HO1, HO2) disposed longitudinally and symmetrically with respect to the core.

2. The optical fiber according to claim 1, in which the pressure conversion arrangement comprises a plurality of pairs of rod-like holes (HO) comprised within a plurality of rod-like stress-inducing elements (SE).

3. The optical fiber according to claim 2, in which the plurality of pairs of rod-like holes (HO) are disposed so that these form a pair of clusters.

4. The optical fiber according to claim 3, in which the pair of clusters is bowtie-shaped in a transverse cross-section of the optical fiber.

5. The optical fiber according to claim 4, in which the rod-like stress-inducing elements (SE) have a thermal expansion coefficient different from that of the cladding (CL).

6. The optical fiber according to claim 5, in which the rod-like stress-inducing elements (SE) comprise borosilicate.

7. The optical fiber according to claim 6, in which the core (CO) is provided with a fiber Bragg grating (FBG).

8. The optical fiber according to claim 1, in which the rod-like stress-inducing elements (SE) have a thermal expansion coefficient different from that of the cladding (CL).

9. The optical fiber according to claim 8, in which the rod-like stress-inducing elements (SE) comprise borosilicate.

10. The optical fiber according to claim 9, in which the core (CO) is provided with a fiber Bragg grating (FBG).

11. The optical fiber according to claim 1, in which the core (CO) is provided with a fiber Bragg grating (FBG).

12. A pressure measurement system (PMS) comprising:
- a light-injecting arrangement (LSC, FC1, CIR, FC2) for injecting light (LI) into an optical fiber (FD) according to any of the preceding claims, so as to obtain a response (LR); and
- a measurement arrangement (OSA) for measuring a parameter ($\Delta\lambda$) of the response that varies as a function of birefringence of the core (CO);

wherein the core (CO) of the optical fiber (FD) is provided with a fiber Bragg grating (FBG); and the measurement arrangement (OSA) is arranged to measure a difference ($\Delta\lambda$) between two Bragg wavelengths ($\lambda 1, \lambda 2$), which the fiber Bragg grating (FBG) exhibits as result of the birefringence.

13. The pressure measurement system according to claim 12, in which:
- the light injecting arrangement (LSC, FC1, CIR, FC2) comprises a broad spectrum light source (LSC) so that the light injected (LI) into the optical fiber (FD) exhibits a spectrum susceptible of comprising the two Bragg wavelengths ($\lambda 1, \lambda 2$); and
- the measurement arrangement comprises an optical spectrum analyzer (OSA) for measuring a spectrum of reflected light (LR) returned by the fiber Bragg grating (FBG).

14. A method of measuring pressure comprising:
- a preparation step in which an optical fiber (FD) is placed in an environment (ENV) in which pressure needs to be measured; said optical fiber (FD) comprising a core (CO); a cladding (CL) surrounding and contacting the core, a pressure conversion arrangement (HO) embedded in the cladding for converting isotropic external pressure applied to the optical fiber into pressure-dependent anisotropic stress applied to the core, the pressure conversion arrangement being disposed with respect to a stress-applying arrangement so that the pressure-dependent anisotropic stress enhances the deformation of the core caused by the constant anisotropic stress; a hollow stress-applying arrangement (SE) embedded in the cladding for applying constant anisotropic stress on the core, wherein the pressure conversion arrangement (HO) is comprised within the hollow stress-applying arrangement (SE);
- a light injecting step in which light (LI) is injected into the optical fiber (FD), so as to obtain a response (LR); and
- a measurement step in which a physical parameter ($\Delta\lambda$) of the response that varies as a function of birefringence of the core (CO) is measured;

wherein the core (CO) of the optical fiber (FD) is provided with a fiber Bragg grating (FBG); and the measurement step is arranged to measure a difference ($\Delta\lambda$) between two Bragg wavelengths ($\lambda 1, \lambda 2$), which the fiber Bragg grating (FBG) exhibits as result of the birefringence.

15. The method according to claim 14 wherein the environment (ENV) is a subterranean wellbore.

16. The method of claim 14, wherein the hollow stress-inducing elements (SE) have a thermal expansion coefficient different from that of the cladding (CL).

\* \* \* \* \*